(12) United States Patent
Li et al.

(10) Patent No.: US 7,661,038 B2
(45) Date of Patent: Feb. 9, 2010

(54) LINK ADAPTATION FOR RETRANSMISSION ERROR-CONTROL TECHNIQUE TRANSMISSIONS

(75) Inventors: Qinghua Li, Sunnyvale, CA (US);
Guangjie Li, Beijing (CN); Shanshan Zheng, Beijing (CN); Xintian Eddie Lin, Mountain View, CA (US); Jun Shi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 11/539,867

(22) Filed: Oct. 9, 2006

(65) Prior Publication Data

US 2008/0086662 A1    Apr. 10, 2008

(51) Int. Cl.
*G06F 11/00* (2006.01)
(52) U.S. Cl. .................... 714/704; 714/748
(58) Field of Classification Search ............. 370/394; 375/295; 455/226.3; 714/18, 749, 704, 748
See application file for complete search history.

(56) References Cited

U.S. PATENT DOCUMENTS

| | | | |
|---|---|---|---|
| 6,618,375 B2 * | 9/2003 | Rezaiifar et al. ............. 370/394 |
| 7,123,617 B1 * | 10/2006 | Abrol ............................ 370/394 |
| 7,289,574 B2 * | 10/2007 | Parolari ......................... 375/295 |
| 7,484,120 B2 * | 1/2009 | Fong et al. ...................... 714/18 |
| 2002/0176362 A1 | 11/2002 | Yun et al. |
| 2006/0018397 A1 | 1/2006 | Sampath et al. |
| 2007/0238430 A1 * | 10/2007 | Himayat et al. .......... 455/226.3 |
| 2009/0150738 A1 * | 6/2009 | Nishio et al. ................. 714/749 |

FOREIGN PATENT DOCUMENTS

| | | |
|---|---|---|
| WO | WO 0201743 | 1/2002 |
| WO | WO 03019812 | 3/2003 |

OTHER PUBLICATIONS

Wan et al., "A Fading-Insensitive Performance Metric for a Unified Link Quality Model," published Apr. 2006, 5 pgs.

* cited by examiner

*Primary Examiner*—David Ton
(74) *Attorney, Agent, or Firm*—Schwabe, Williamson & Wyatt, P.C.

(57) ABSTRACT

Embodiments of the present invention provide for link adaptation computations accounting for retransmission error-control techniques to be employed in transmission sequences utilizing the adapted link. Other embodiments may be described and claimed.

27 Claims, 11 Drawing Sheets

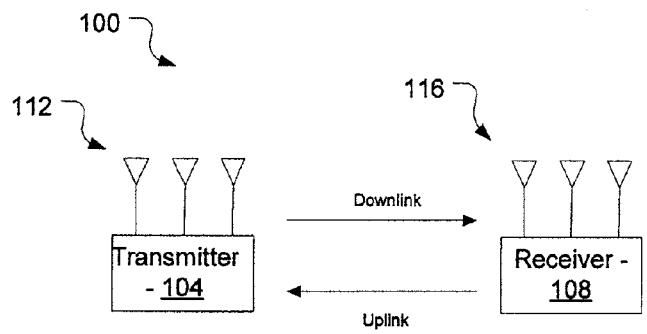
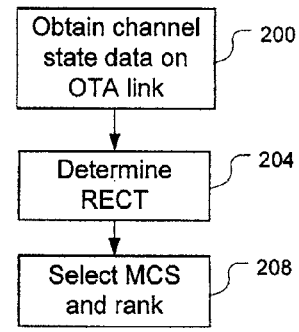
FIG. 1
FIG. 2
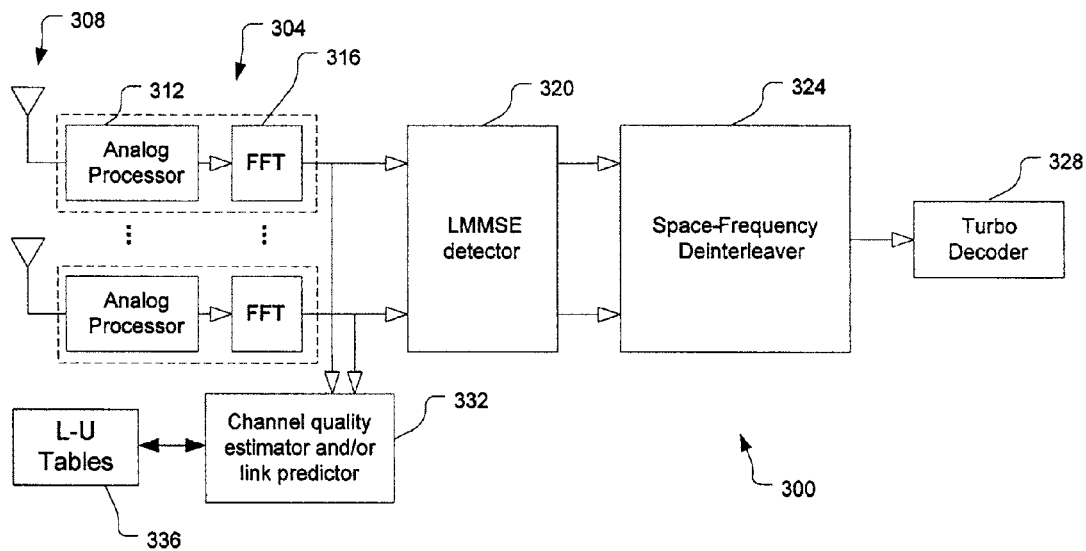
FIG. 3

LINK ADAPTATION FOR RETRANSMISSION ERROR-CONTROL TECHNIQUE TRANSMISSIONS

FIELD

Embodiments of the present invention relate to the field of wireless networks, and more particularly, to link adaptation for retransmission error-control technique transmissions.

BACKGROUND

In wireless networks a time variant channel may cause fluctuations in communication link qualities. A receiver may compute the channel qualities and feed-back information to a transmitter. This feedback may assist the transmitter in selection of modulation and coding schemes (MCSs) for the link. For a multiple-input, multiple-output (MIMO) link, the number of spatial channels (or "layers") may also be adapted to the channel qualities. The total number of active spatial channels may be referred to as the rank. Adapting the MCS and rank in light of channel conditions may be referred to as link adaptation.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 1 illustrates a wireless communication system in accordance with various embodiments of the present invention;

FIG. 2 illustrates a flowchart of a link adaptation operation in accordance with various embodiments of the present invention;

FIG. 3 illustrates a multiple-input receiver in accordance with various embodiments of the present invention;

DETAILED DESCRIPTION OF EMBODIMENTS OF THE INVENTION

Figure 4:
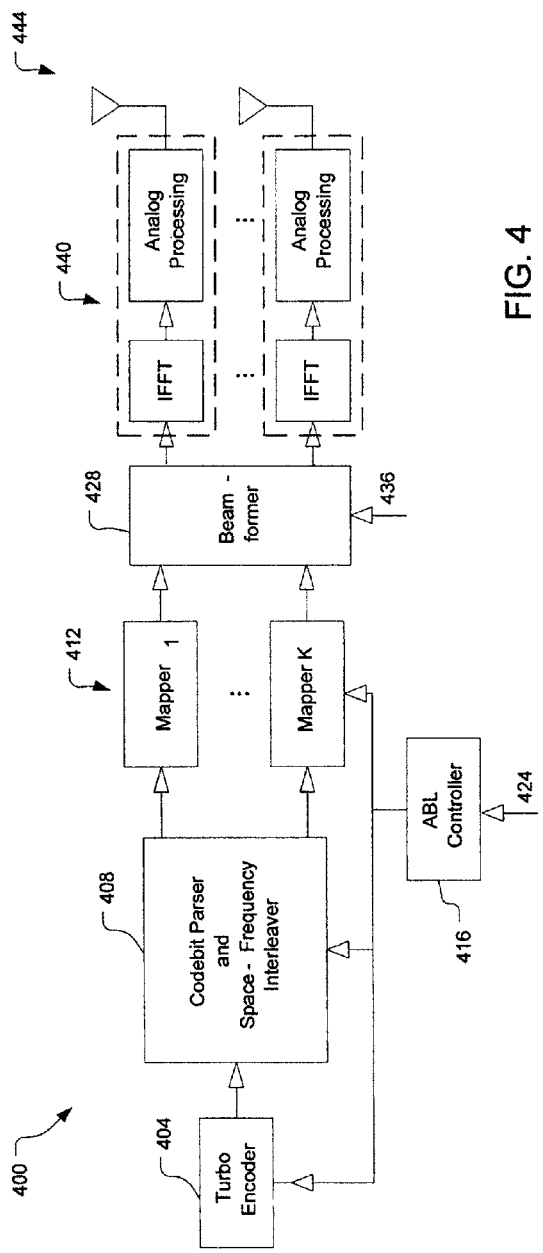
FIG. 4 illustrates a single codeword multiple-input, multiple-output transmitter in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)." For the purposes of the present invention, the phrase "(A)B" means "(B) or (AB)," that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide for link adaptation computations accounting for retransmission error-control techniques to be employed in transmission sequences utilizing the adapted link.

FIG. 1 illustrates a MIMO communication system 100 in accordance with an embodiment of this invention. In this embodiment, both a transmitter 104 and receiver 108 may have multiple antennas, e.g, three transmit antennas 112 and three receive antennas 116, respectively. The transmit antennas 112 and receive antennas 116 may provide their respective devices with a wireless interface to an over-the-air (OTA) communication link. In various embodiments, any number of transmit and/or receive antennas may be employed. An embodiment including one transmit and/or receive antenna may be referred to as a single-input, single-output system. The multiple antennas can form one or more spatial channels.

The transmitter 104 may communicate data to the receiver 108 through a series of transmission sequences via the OTA communication link. In particular, a transmission from the transmitter 104 to the receiver 108 may be referred to as the downlink (DL) portion of the OTA communication link, while a transmission from the receiver 108 to the transmitter 104 may be referred to as the uplink (UL) portion of the OTA communication link. The OTA communication link may have any number of active spatial channels, or rank, e.g., from one to three (the number of transmit antennas 112). The transmit antennas 112 may cooperate to provide beamforming weighting in an embodiment where the OTA communication link has a rank less than the number of the transmit antennas 112, e.g., two or one in the illustrated embodiment.

In general, while an increase in rank may allow for more data streams to be sent, it may also increase the amount of spatial interference across spatial channels and may reduce the transmission power of each data stream, thereby decreasing the throughput and/or reliability of each data stream. Furthermore, modulation and coding schemes (MCSs) employed by the transmitter 104 to modulate and encode the data to be transmitted may also have varying effect on the transmission characteristics of the OTA communication link, e.g., throughput rates and/or reliability, given channel conditions.

In various embodiments candidate MCSs may include different combinations of modulation levels (e.g., quadrature phase shift keying (QPSK), 16 quadrature amplitude modulation (QAM), 64 QAM, etc.) and code rates (e.g., 1/2, 2/3, 3/4, 5/6, etc.).

In embodiments of this invention the transmitter 104 may adapt various link adaptation parameters based on observations of the OTA communication link in order to facilitate the achievement of desired transmission characteristics, e.g., increased overall throughput and/or reliability of the data transmissions, of the MIMO communication system 100.

In various embodiments, the system 100 may include error correction techniques in data transmissions between the transmitter 104 and the receiver 108. In an embodiment, the transmitter 104 may introduce various redundancies in transmitted messages that the receiver 108 may use to correct errors. This may reduce the amount of message retransmissions. This may be referred to as forward error correction (FEC).

In an embodiment, the transmitter 104 may send a single FEC codeword through multiple spatial channels. Each spatial channel may have the same code rate. This may be referred to as a single codeword (SCW) MIMO.

In another embodiment, the transmitter 104 may send multiple FEC codewords by multiple channels. This may be referred to as a multiple codeword (MCW) MIMO. In an MCW MIMO a codeword may be in one or multiple spatial channels. The code rates of each codeword may be different.

In various embodiments, the MIMO communication system 100 may employ retransmission error-control techniques (RECT) such that when codewords are not successfully received by the receiver 108, the transmitter 104 may retransmit a portion or all of the codeword. In an embodiment, the retransmission error-control technique may be a hybrid-automatic retransmission request (H-ARQ) that operates as follows. When the receiver 108 fails to decode one FEC codeword, it may upload a request to the transmitter 104 to send additional signals for the information bits in the original FEC codeword. The receiver 108 may combine the information gained from multiple receptions about the same information bits and decode for the information bits. For MCW, a codeword that is successfully decoded may not be sent in the retransmission for the unsuccessful ones.

A receiver 108 in an MCW MIMO embodiment may use successive interference cancellation (SIC) to decode data streams as follows. It may first decode one symbol (or one FEC codeword) and then subtract the signal component contributed by the decoded data from the received signal vectors. After the subtraction, the signal quality of the remaining data may be improved and the receiver 108 may start the second iteration to decode the second symbol (or another FEC codeword). The iteration may repeat until all data is detected. If one FEC codeword is not successively decoded, no subtraction may be conducted and retransmission may be incurred for the subsequent codewords. The signal model of the received signal may be represented by $$y^{(1)} = H \begin{bmatrix} x_1 \\ \vdots \\ x_K \end{bmatrix} + n,$$ [EQ. 1]

where H is the channel matrix (with or without beamforming) on one subcarrier or space-time code matrix on one or more subcarriers, x is the transmitted signal vector or input signal vector of space-time code, n is the noise plus interference vector. x may include K symbols and each symbol may include codebits from one FEC codeword. The structure of H may change with MIMO and multiple-input single-output (MISO) transmission schemes such as spatial multiplexing and space-time coding. The total power of x may be constant. In a SIC receiver, $x_1, \ldots, x_K$ may be decoded sequentially. After $x_1$ is decoded, its component (or interference) may be removed from $y^{(1)}$ as $$y^{(2)} = y^{(1)} - h_1 x_1 = H \begin{bmatrix} 0 \\ x_2 \\ \vdots \\ x_K \end{bmatrix} + n,$$ [EQ. 2]

where $h_1$ is the first column of H. The remaining signal $y^{(2)}$ may be used for the decoding $x_2$.

While these error-control and/or interference cancellation techniques tend to increase the performance of the system 100, they may complicate link adaptation computations and are therefore ignored in conventional link adaptation operations.

FIG. 2 illustrates a flowchart of a link adaptation operation in accordance with various embodiments of the present invention. In this embodiment, a link predictor (found in either the transmitter 104 or the receiver 108) may obtain channel state data on the OTA communication link, block 200. This data may be obtained through direct observation, feedback, prediction, etc. The link predictor may determine the RECT to be used in transmission sequences from the transmitter 104 to the receiver 108, block 204. The link predictor may then select an MCS and rank from a number of candidates for use by the transmitter 104 based on the determined RECT and channel state information, block 208. Factoring in the determined RECT may facilitate a more accurate link prediction to be used in the selection of the MCS and rank. These operational blocks will be discussed below in more detail in accordance with various embodiments of the present invention.

FIG. 3 illustrates a multiple input receiver 300 that may be used interchangeably with the receiver 108 in accordance with various embodiments of this invention. In this embodiment, the receiver 300 may include a receive chain 304 corresponding to each of its receive antennas 308. Each receive chain 304 may include components for analog processing 312 and/or fast fourier transforming (FFT) 316 of a received signal. The receiver 300 may have a linear minimum mean squared error (LMMSE) detector 320 coupled to the receive chains 304 for initial error detection computations. The LMMSE detector 320 may couple the received signal(s) to a space-frequency deinterleaver 324 to unpack interleaved transmissions. The receiver 300 may also have a turbo decoder 328. The turbo decoder 328 may decode the encoded transmission taking into account likelihood data introduced by a complementary front-end turbo encoder of a corresponding transmitter, e.g., transmitter 104.

The receiver 300 may also include a channel quality estimator and/or link predictor (link adaptor) 332 coupled to the receive chains 304. In various embodiments, the channel quality estimator of the link adaptor 332 may observe the OTA communication link and estimate channel state data, e.g., the interference and noise levels. The link predictor of the link adaptor may receive this channel state data and perform various link predictions based on available MCSs, ranks, spatial multiplexing schemes, and/or diversity transmission schemes, e.g., space-time code. The link predictor may reference lookup tables 336 to perform the various link prediction operations as will be discussed in further detail below.

The link adaptor 332 may use the link predictions to determine the link adaptation parameters, e.g., particular MCS and/or rank, which are likely to result in desired transmission characteristic of an OTA communication link given the conditions portrayed by the channel state data. In various embodiments, these desired transmission characteristics may be relatively high throughput and/or reliability. The link adaptation parameters may then be uploaded to the transmitter 104 for use in subsequent DL transmission sequences.

In various embodiments, the components of a link adaptor may be distributed between the receiver 108 and transmitter 104 in a manner other than as shown in FIG. 3. For example, in various embodiments the receiver 108 may include an estimator to observe the channel quality, e.g., noise and interference levels, which is then uploaded to the transmitter 104 having a link adaptor to perform various link adaptation computations. This may be suitable in an embodiment where the transmitter 104 cannot directly observe the same channel as the receiver 108, e.g., in a frequency division duplexing (FDD) embodiment. In another embodiment, the transmitter 104 may be able to observe the same channel as the receiver 108, e.g., in a time division duplexing (TDD) embodiment. In this embodiment, either the transmitter 104 or the receiver 108 may include the estimator and/or the predictor.

FIG. 4 illustrates an SCW transmitter 400 that may be used interchangeably with transmitter 104 in accordance with various embodiments of the present invention. The transmitter 400 may include a turbo encoder 404 to encode a bit-stream with binary data. This turbo encoding may facilitate the transmission of a relatively large amount of data over a noisy channel as compared to many other encoding options. However, various embodiments may use other encoding options.

The encoded bit stream may then be parsed and spatially and/or frequency interleaved into multiple data streams by parser-interleaver 408. Each of the multiple data streams may be mapped by a respective mapper, e.g., QAM mappers 1-K 412 onto a plurality of symbols, e.g., QAM symbols. The transmitter 400 may include an adaptive bit loading (ABL) controller 416 coupled to the turbo encoder 404, the parser-interleaver 408, and the mappers 412 as shown. The ABL controller 416 may receive selected MCS 424 from a link adaptor and determine the modulation level and code rate of the data streams. As discussed above, while the modulation levels of each data stream may differ, the code rate may remain the same in an SCW MIMO embodiment. The transmitter 400 may include a beamformer 428 that transposes the symbols from the mappers 412 onto a number of spatial channels based on the feedback rank 436 from the receiver 108. The transmit chains 440 and antennas 444 may be used to transmit the data streams on the selected number of spatial channels via the OTA communication link.

Figure 5:
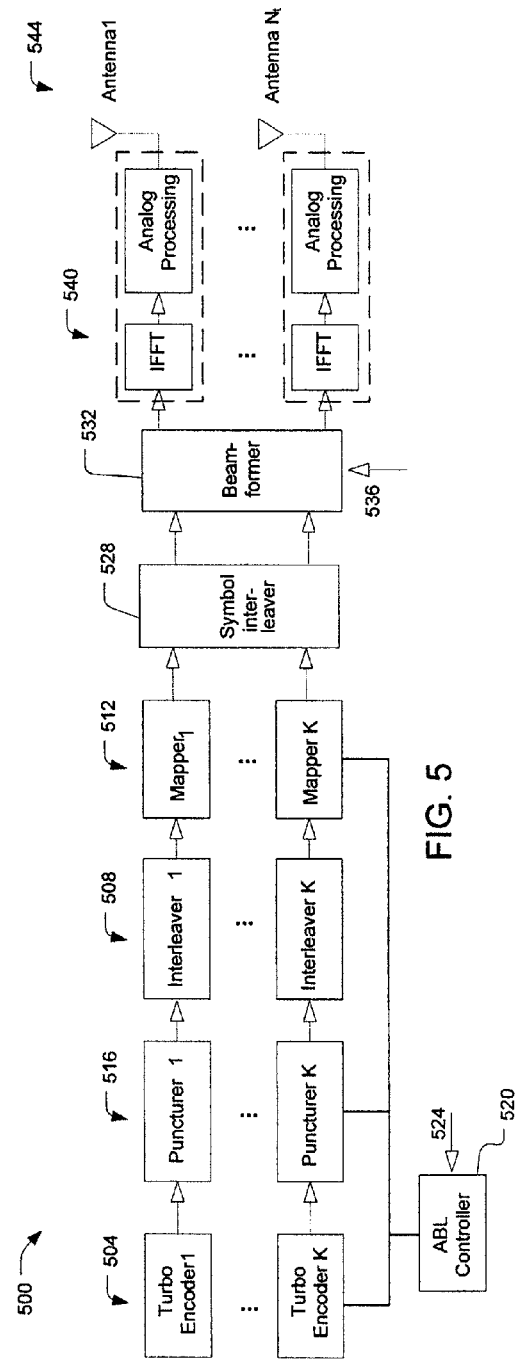
FIG. 5 illustrates a multiple codeword multiple-input, multiple-output transmitter in accordance with various embodiments of the present invention.

FIG. 5 illustrates an MCW transmitter 500 that may be used interchangeably with transmitter 104 in accordance with various embodiments of the present invention. The transmitter 500 may include turbo encoders 504, data stream interleavers 508, and mappers 512 for each of K data streams. The transmitter 500 may also include puncturers 516 used to puncture the data streams by removing some of the parity bits after encoding with an error-correction code. The receiver 108 may employ a corresponding depuncturer to employ an inverse operation. An ABL controller 520 may control operation of the turbo encoders 504, puncturers 516, and/or mappers 512 based on feedback MCS 524 received from receiver 108.

The MCW transmitter 500 may also employ a symbol interleaver 528 to interleave the symbols from different FEC codewords across data streams. The symbol interleaver 528 may not be used in some embodiments. The MCW transmitter 500 may include a beamformer 532 to transpose the symbols onto a number of spatial channels based on feedback rank 536 from the receiver 108 and transmit the symbols via the transmit chains 540 and antennas 544.

Figure 6:
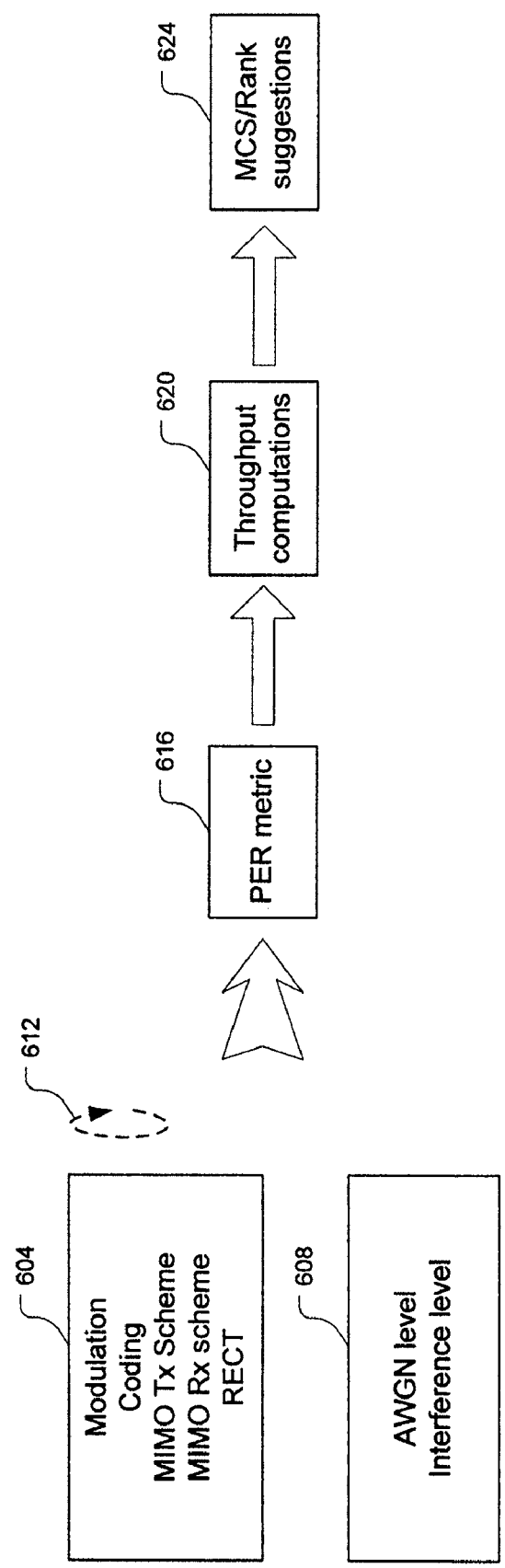
FIG. 6 illustrates operational phases of a link adaptation in accordance with various embodiments of the present invention.

FIG. 6 illustrates operational phases of a link adaptor, e.g., link adaptor 332 of FIG. 3, in accordance with various embodiments of the present invention. Rx-Tx factors 604 related to the receiver-transmitter may include modulation levels, code rates, MIMO Tx scheme (e.g., rank); MIMO Rx scheme (successive interference cancellation (SIC), etc.), retransmission error-control technique (e.g., H-ARQ, etc.). Realization factors 608 relating to the channel conditions may include additive white Gaussian noise (AWGN) and interference level, etc. Link adaptation parameters 612, that is the parameters that are adjustable to account for particular channel conditions, may include the modulation and coding scheme (MCS) and the MIMO Tx Scheme (rank).

The link adaptor 332 may develop a packet error rate (PER) metric 616 to be used in the link prediction computations based on the factors 604 and 608. The link adaptor 332 may perform a series of throughput computations 620 and provide the suggested link adaptation parameters 624 resulting in a desired throughput, which may be the relative maximum throughput of the various MCS and rank combinations. While embodiments of the present invention discuss relatively maximized throughput as the desired transmission characteristic other embodiments may include similar calculations for reliability.

In various embodiments, the MIMO transmission scheme in 604 may be extended to include MISO schemes and space-time coding schemes and then 624 may also report the selection between space-time code and spatial multiplexing. A space-time block code embodiment may involve replacing the channel matrix in EQ. 1 with a space-time block code matrix.

The PER metric 616 and throughput computations 620 may be designed to predict candidate MCS performance given a set of channel state information, which may be derived from realization factors 608 over channel matrices of subcarriers for a MIMO or MISO link. The throughput may be determined by the maximum sum data rate of the MCSs, the rank, and the packet error rates (PERs) of the transmission and retransmissions. In an embodiment, the maximum data rate without any error per subcarrier may be computed as $$d_{\max} = r_s \sum_{k=1}^{K} b_k, \text{ for } SCW; \quad [\text{EQ. 3}]$$

$$d_{\max} = \sum_{k=1}^{K} r_k b_k, \text{ for } MCW; \quad [\text{EQ. 4}]$$

where K is the rank; $r_s$ is the common code rate for SCW; $r_k$ is the code rate for the $k^{th}$ layer (or codeword) of MCW; $b_k$ is the number of bits per QAM symbol for the $k^{th}$ layer (or codeword or data stream or spatial channel). The throughput of one transmission, which may be obtained from the correctly received FEC codeword, may be computed as $$t_p = d_{max}(1 - p_s), \text{ for } SCW; \quad \text{[EQ. 5]}$$

$$t_p = \sum_{k=1}^{K} r_k b_k (1 - p_k), \text{ for } MCW; \quad \text{[EQ. 6]}$$

where $p_s$ is the PER of the FEC codeword for SCW; $p_k$ is the PER of the $k^{th}$ layer (or codeword) for MCW. Since link adaptation may be intended to increase the throughput, for example, the PERs $p_s$ and $p_k$ may be of value for the evaluation of each candidate MCS combination. The PERs $p_s$ and $p_k$ may be nonlinear functions for FEC AMI may be used to look up PER with little error. The framework of the lookup metric for PER may be $$m = f_{MCS}^{-1}\left(\frac{1}{L}\sum_{i=1}^{L} f_{MCS}(SINR_i)\right), \quad \text{[EQ. 8]}$$

where $f_{MCS}()$ is a transfer function of signal to interference plus noise (SINR) for a given MCS; i is the index of SNR obtained from subcarriers (or spatial channels, time slots, etc.). For exponential effective SNR mapping (EESM), the transfer function may be $$f_{MCS}(SINR) = \exp\left(-\frac{SINR}{c_{MCS}}\right), \quad \text{[EQ. 9]}$$

where $C_{MCS}$ is a correction factor for the MCS and the desired PER range. For mutual information of a scalar or matrix channel, the transfer function may be $$f_{MS}(SINR) = I(X; Y|SINR, MS) \quad \text{[EQ 10]}$$
$$= E_{X,Y|SINR,MS}\left(\log_2 \frac{p(Y|X, SINR, MS)}{p(Y)}\right),$$

where Y=X+N; Y, X, and N are received signal, transmitted signal, and noise respectively; MS is the modulation scheme or input alphabet of X; I(X;Y|SINR, MS) denotes mutual information between X and Y for a given SINR and an input alphabet of X. Although both EESM and mutual information may be used to build PER lookup tables, mutual information may generate less error than EESM.

Figure 9:
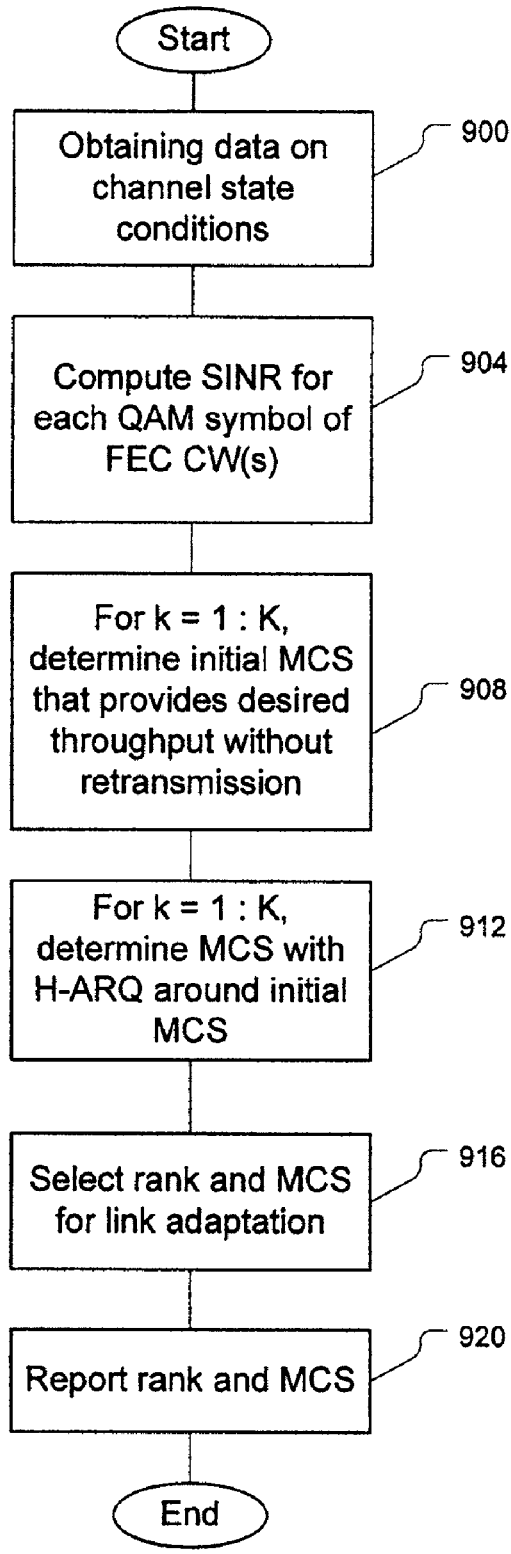
FIG. 9 illustrates a flowchart depicting a link adaptation in accordance with various embodiments of the present invention.

FIG. 9 illustrates a flowchart depicting a link adaptation in accordance with various embodiments of the present invention. The link adaptor may obtain data on the channel state conditions of the OTA communication link such as, but not limited to, noise and interference, block 900. As discussed above, this channel state data may be codeword size, channel realization, modulation constellation, code rate, H-ARQ combining technique (for retransmission cases), and noise plus interference level. Therefore, it may be challenging to estimate them.

In an embodiment, a measurement of the mutual dependence of a transmitted signal, X, and a received signal, Y, may be used to predict PER. This measurement may be referred to as mutual information. Mutual information between random variable X and Y may be defined as $$I(X, Y) = \int f(x, y) \log \frac{f(x, y)}{f(x)f(y)} dx dy, \quad \text{[EQ. 7]}$$

where f (x,y) may be the joint probability density function of X and Y, f (x) and f (y) may be the probability density functions of X and Y respectively. I (x,y) may be computed for scalar AWGN channel with discrete QAM input X and continuous output Y using lookup tables.

Figure 7:
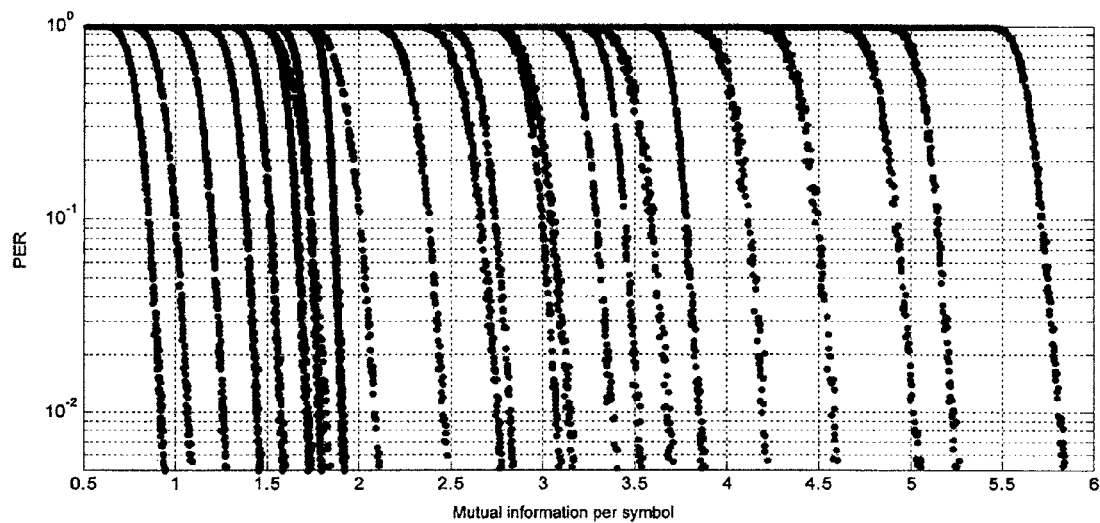
FIG. 7 illustrates a plot of mutual information per symbol for use in various embodiments of the present invention.

FIG. 7 illustrates a graph plotting various channel realizations for seventy-five subcarriers of a SISO channel with the mutual information per symbol on the x-axis and the PER on the y-axis. The lines may correspond to different MCSs, with approximately 24 MCSs represented.

Figure 8:
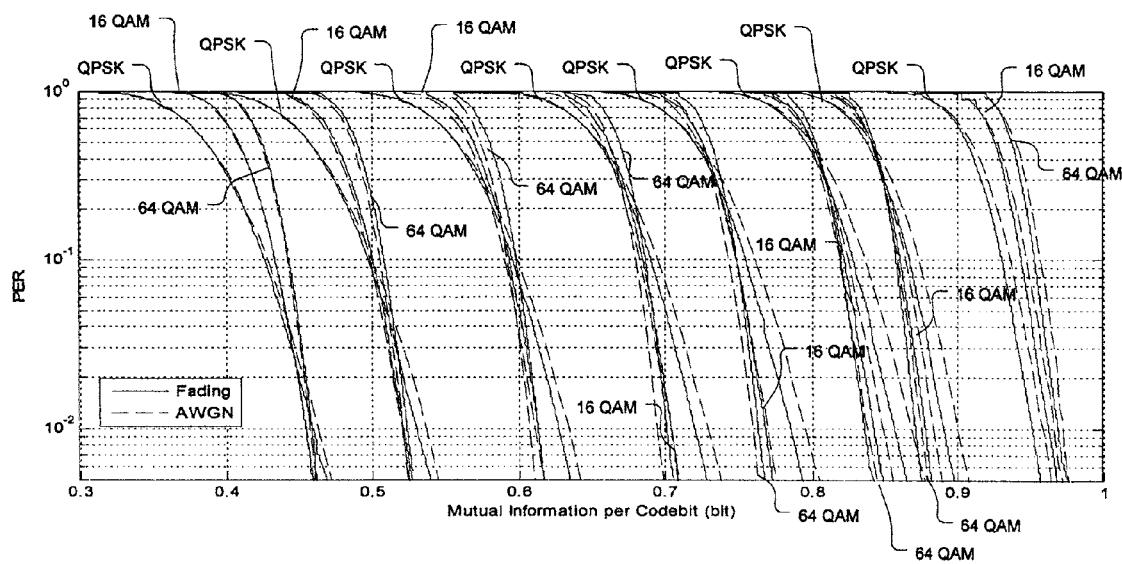
FIG. 8 illustrates a chart of mutual information per codebit per packet error rate for use in various embodiments of the present invention.

FIG. 8 illustrates a fitting line of the points shown in FIG. 7 in accordance with various embodiments. In FIG. 8, the PER is charted against normalized mutual information, e.g., mutual information of one symbol divided by the number of bits in the symbol. The solid and dashed lines are for fading and AWGN channels, respectively. The modulation levels represented are QPSK, 16 QAM, and 64 QAM. As can be seen, the PER vs. AMI curves are almost invariant to a fading channel realization. Therefore, obtained through direct observation, feedback, prediction, etc. A channel estimator of the link adaptor may receive the channel state data and compute SINRs for each symbol of one or more FEC codeword(s), block 904. In some embodiments, a MIMO link may be decomposed into multiple SISO channels by the receiver 108 in order to simplify computations of the SINR. The decomposition may be determined by the reception scheme such as MMSE and SIC.

Following computation of the signal to interference plus noise ratios (SINRs), a link predictor may determine, for each of a number of ranks, an initial MCS that provides a desired throughput characteristic for a transmission sequence that does not utilize a RECT, e.g., a non H-ARQ transmission, block 908. In various embodiments the desired throughput characteristic may be a relatively high throughput value.

The link predictor may, for each rank, determine a candidate MCS for a transmission sequence utilizing a RECT, e.g., an H-ARQ transmission, block 912. This determination may be based at least in part on the initial MCS of each rank. The link adaptor 332 may then select the MCS and corresponding rank that provides the greatest potential throughput (or other desired transmission characteristic) from all of the candidate MCSs, block 916, and report the selected MCS and rank to the ABL controller and beamformer, block 920.

In various embodiments, the process illustrated by FIG. 9 may be employed for the initial link adaptation computation of a sequence of adaptation operations over time and/or frequency when there is correlation between the channel state across operations.

Figure 10:
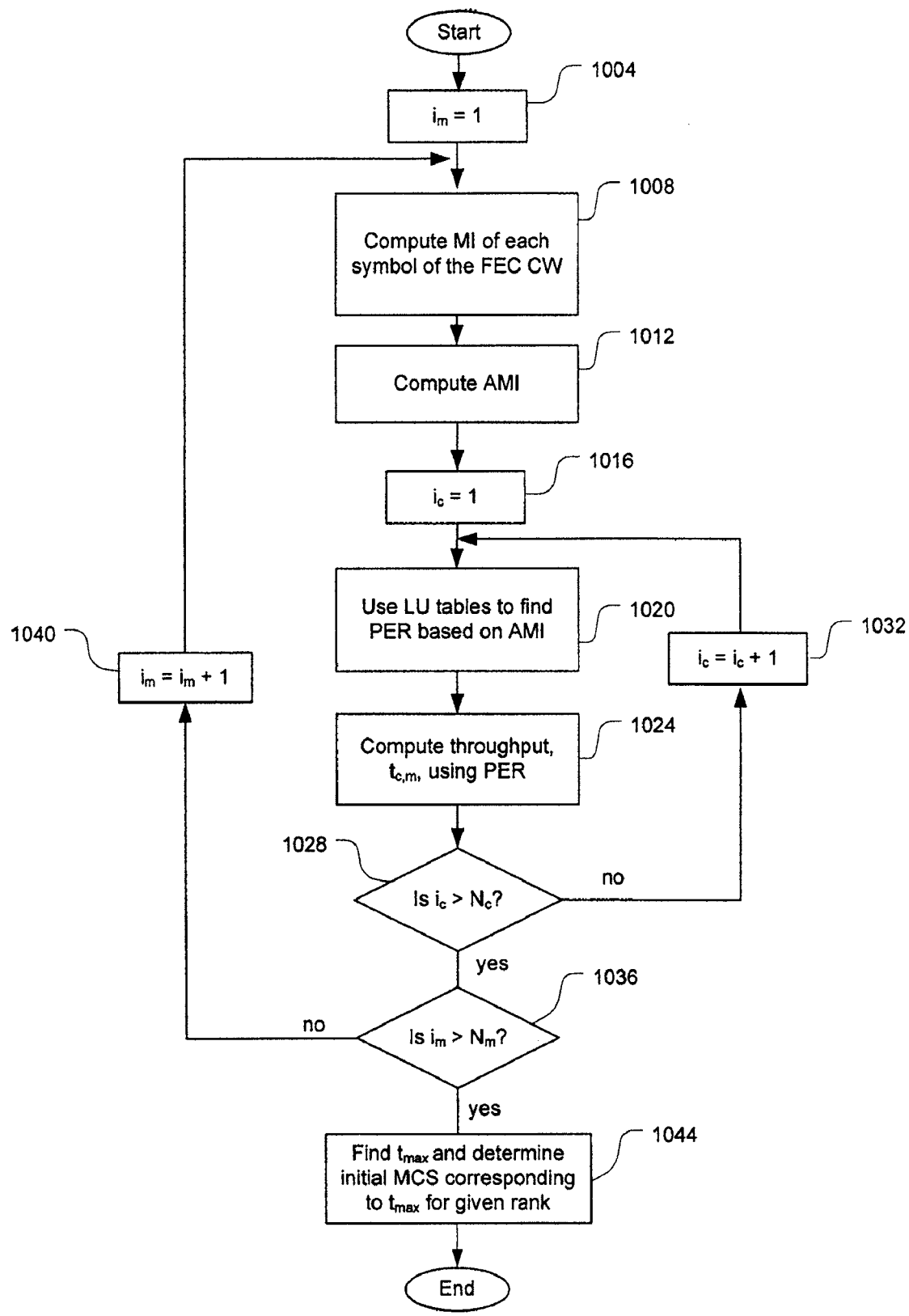
FIG. 10 illustrates a flowchart of an initial modulation and coding scheme determination in accordance with various embodiments of the present invention.

FIG. 10 illustrates a flowchart of an initial MCS determination in accordance with various embodiments of the present invention. After an initiation of the determination operation, a modulation index, $i_m$, may be set to 1, block 1004. Mutual information of each symbol of an FEC codeword may be computed using the SINR from block 904 and a modulation level corresponding to the current modulation index, $i_m$, block 1008. This MI may be computed for each of the subcarriers of a given rank and an average MI (AMI) may be computed over all of the subcarriers, block 1012.

A code rate index, $i_c$, may be set to 1, block 1016. The link predictor may use the computed AMI from block 1012 to lookup PER by referencing lookup tables storing PER vs. AMI curves similar to the one shown in FIG. 8, block 1020. This PER metric may be used to compute throughput, $t_{c,m}$ for the given rank with the given $MCS_{c,m}$, block 1024.

The code rate index, $i_c$, may be compared to the total number of code rates, $N_c$, block 1028, and if it is not greater, the code rate index, $i_c$, may be incremented, block 1032, and the process may loop back to block 1020 for the next PER lookup, block 1020. If the code rate index, $i_c$, is greater than the total number of code rates, $N_c$, the modulation index, $i_m$, may be referenced, block 1036.

If the modulation index, $i_m$, is not greater than the total number of modulation levels, $N_m$, then the modulation index, $i_m$, may be incremented, block 1040, and the process may loop back to computation of MI, block 1008.

If the modulation index, $i_m$, is greater than the total number of modulation levels, $N_m$, then all of the throughputs have been computed. The maximum throughput, $t_{max}$, may be determined from a comparison of the computed throughputs and the MCS corresponding to the maximum throughput, $t_{max}$, may be established as the initial MCS for the given rank, block 1044.

Figure 11:
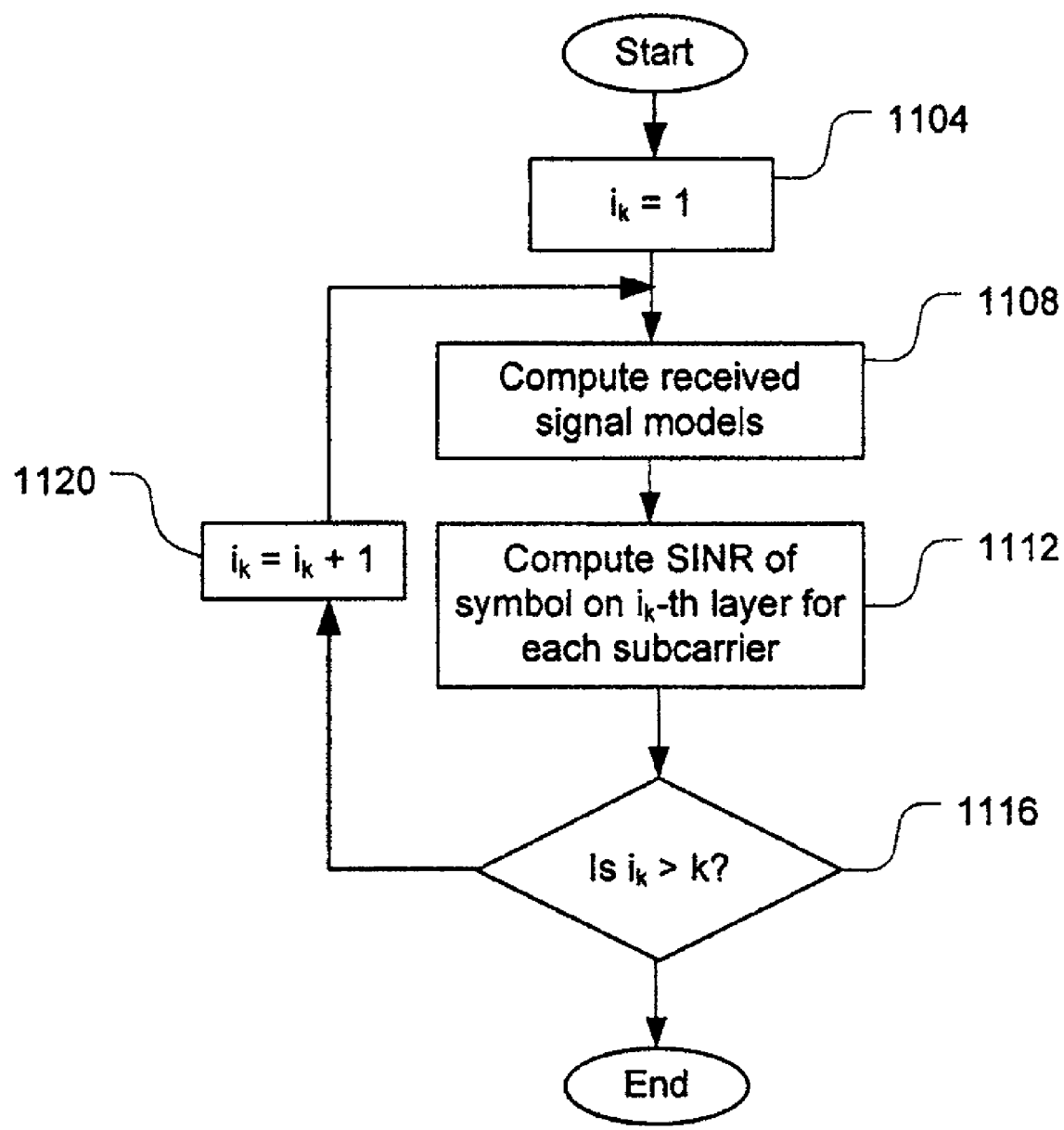
FIG. 11 illustrates a flowchart for computing signal-to-noise and interference ratios in accordance with various multiple codeword embodiments of the present invention.
Figure 12:
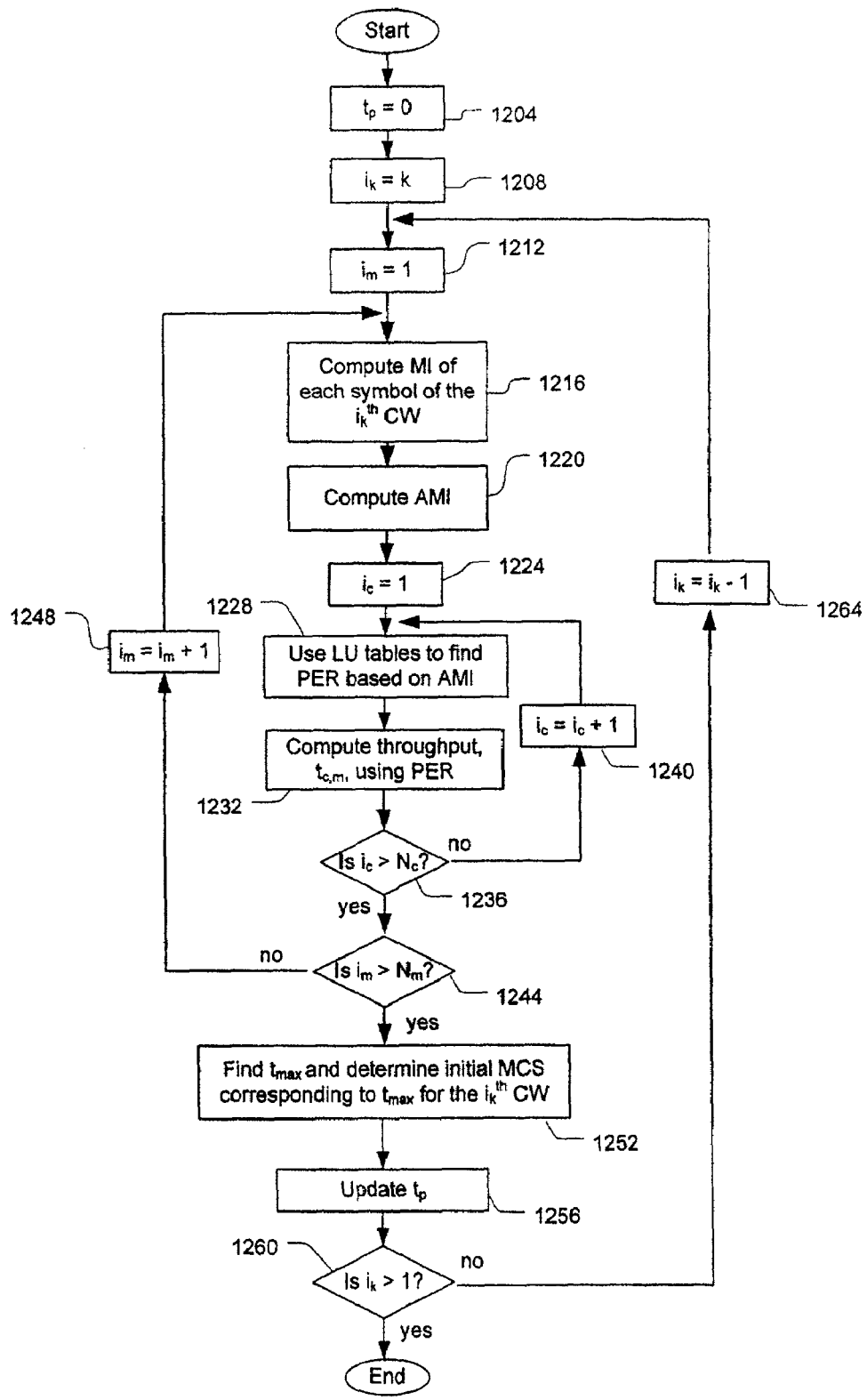
FIG. 12 illustrates a flowchart for computing initial modulation and coding schemes in accordance with various multiple codeword embodiments of the present invention.

While the flowcharts illustrated in FIGS. 9 and 10 may be generally applicable to both SCW and MCW embodiments, certain MCW embodiments may include additional/alternative computations. FIGS. 11 and 12 below may discuss various MCW embodiments.

The complexity of obtaining the initial MCS using brute force evaluation in FIG. 10 may be computational expensive for MCW with SIC receiver. For example, the complexity is $O(24^4)$ for four channels, eight code rates, and three modulations. The complexity can be reduced to $O(4*24)$ in the following manner.

Let the decoding ordered sequence of SIC be from codeword 1 to k. The overall throughput with codeword 1 to k may be maximized when the throughput with codewords i, ..., k is maximized when codeword 1, ..., k−1 are correctly decoded and subtracted from the received signals. After interference cancellation of the first layers, the throughput of the remaining layers may be maximized. Therefore, we can maximize the throughput from the last layer (or codeword) to the first. Thus the throughput computation may be in an inverse order from the order in which codewords will be decoded upon receipt by the SIC receiver. For a 3 codeword example, the throughput may be sequentially computed as $$\max_{MCS_1}\left(R_1 + \max_{MCS_2}\left(R_2 + \max_{MCS_3} R_3(1 - PER_3)\right)(1 - PER_2)\right) \quad [\text{EQ. 11}]$$
$$(1 - PER_1),$$

where the maximizations are conducted from the inner to the outer sequentially; $R_i$ is the information data rate of codeword i assuming no decoding error; and $PER_i$ and $R_i$ vary with the modulation and coding scheme of the $i^{th}$ codeword. These sequential computations may facilitate a low complexity process of achieving link adaptation gain since the additional computation with H-ARQ taken into account may be skipped in many applications due to low retransmission rates.

FIG. 11 illustrates a flowchart for computing SINRs in accordance with various MCW embodiments of the present invention. At the start, a rank index, $i_k$, may be set to one, block 1104. The link adaptor may compute received signal models after interference cancellation of the previous k−1 layers for each subcarrier of a given rank as $$y^{(i_k)} = y - [h_1 \ldots h_{i_k-1}]\begin{bmatrix} x_1 \\ \vdots \\ x_{i_k-1} \end{bmatrix} \quad [\text{EQ. 12}]$$
$$= [h_{i_k} \ldots h_k]\begin{bmatrix} x_{i_k} \\ \vdots \\ x_k \end{bmatrix} + n,$$

in block 1108. Each FEC codeword may include symbols from subcarriers in a resource block, where only one (or two) symbols out of the k symbols per subcarrier may be used for the codeword. When there is permutation in MCW, the FEC codeword can pick a different symbol for a different subcarrier. For example, the first FEC codeword may have the $1^{st}$ symbol in the $1^{st}$ subcarrier and the $3^{rd}$ symbol in the $2^{nd}$ subcarrier. The SINR of symbol $x_{i_k}$ may be computed for each subcarrier, block 1112. The layer index, $i_k$, may be compared to the rank, k, block 1116, and if $i_k$ is not greater than the rank, k, $i_k$ may be incremented, block 1120, and the process may loop back to block 1108.

FIG. 12 illustrates a flowchart for computing initial MCSs in accordance with various MCW embodiments of the present invention. The decoding order of the codewords may be assumed to be from 1 to k at the receiver, while the MCS computation order of the codewords may be the opposite at the link adaptor. At the start, a total throughput, $t_p$, may be set to zero, block 1204, the codeword index, $i_k$, may be set to the rank, k, block 1208, and the modulation index, $i_m$, may be set to one, block 1212. The link adaptor may compute the mutual information for each symbol of the $i_k^{th}$ codeword using the SINR computed in block 1112 of FIG. 11 and the MCS of the corresponding modulation index, $i_m$, block 1216. The AMI of all the symbols of the codeword may then be computed, block 1220.

A code rate index, $i_c$, may be set to one, block 1224. The link adaptor may look up the PER of the codeword in the lookup tables storing PER vs. AMI curves, block 1228, where one packet includes one codeword. When one FEC codeword fits in one layer, the codeword size may be determined by the resource block size and the modulation level. As the resource block size is constant in most systems, the codeword size may only be determined by the modulation level and code rate. For example if there are a total of three possible modulation levels, $N_m$, and eight possible code rates, Nc, for each FEC codeword, only twenty-four PER vs. AMI curves may be needed, one for each candidate MCS.

The link adaptor may compute the throughput, $t_{m,c}$, using the PER obtained in block 1228, block 1232. The throughput, $t_{m,c}$, may be computed as $$t_{m,c} = (rb + t_p)(1-p), \quad [\text{EQ. 13}]$$

where r is the code rate, b is the number of bits per QAM symbol, p is the PER, and $t_p$ is the maximized throughput of layers min ($i_k+1$, k), ..., k, assuming layers 1, ..., max ($i_k-1$, 1) are correctly decoded and subtracted.

The code rate index, $i_c$, may be compared to the total number of code rates for each FEC codeword, $N_c$, block 1236, and if it is not greater, the process may increment the code rate index, $i_c$, block 1240, and loop back to block 1228.

If the code rate index, $i_c$, is greater than the total number of code rates for each FEC codeword, $N_c$, the process may determine if the modulation level index, $i_m$, is greater than the total number of modulation levels for a spatial channel, $N_m$, block 1244. If not, the modulation level index, $i_m$, may be incremented, block 1248, and the process may loop back to block 1216. If so, the link adaptor may set the greatest $t_{m,c}$ over $i_c$=1 to $N_c$ and $i_m$=1 to $N_m$ as $t_{max}$, and determine the initial MCS corresponding to $t_{max}$ for the $i_k^{th}$ codeword, block 1252.

The process may update the sum throughput of layers $i_k, \ldots, k$ assuming layers $1, \ldots, \max(i_k-1, 1)$ are correctly decoded and subtracted as $t_p = t_{max}$, block 1256.

The codeword index, $i_k$, may be compared to one, block 1260, and if it is greater, may be decremented, block 1264, and the process may loop back to block 1212. If the codeword index is not greater than one, the process may end.

Figure 13:
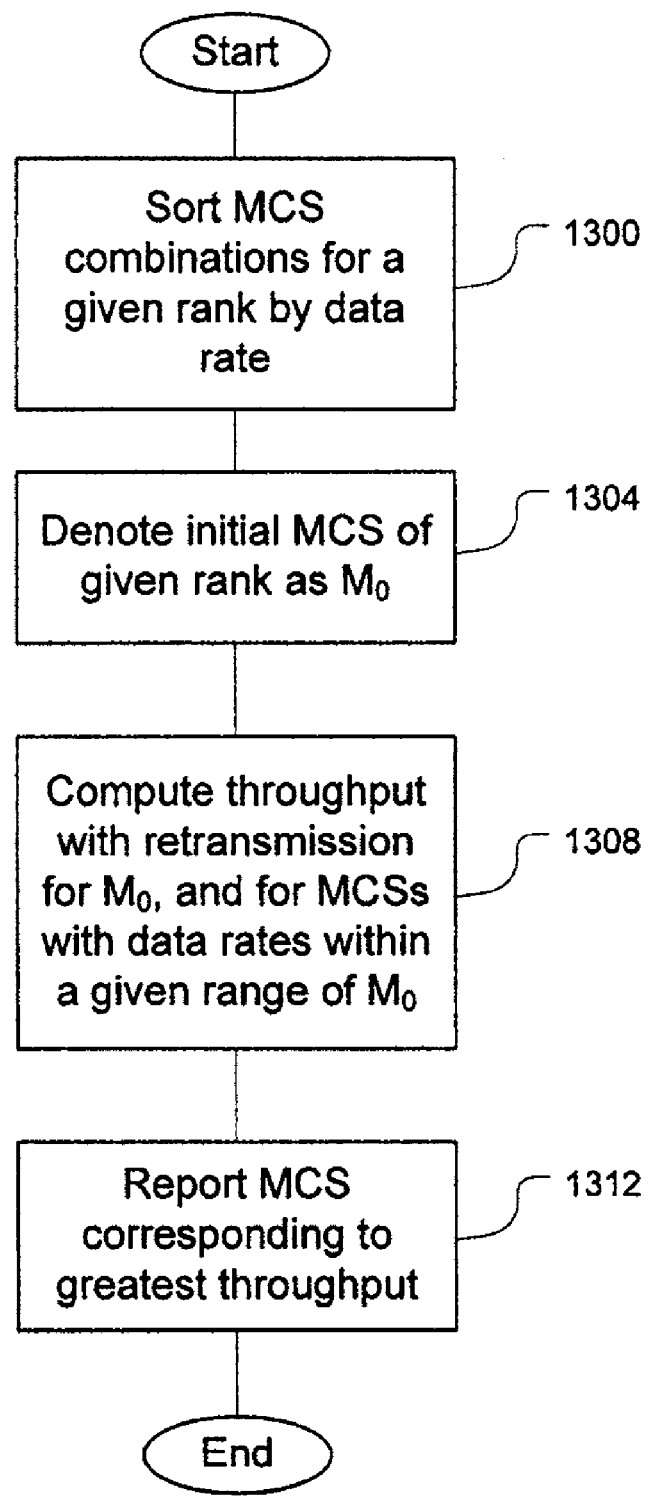
FIG. 13 illustrates a flowchart for determining modulation and coding schemes for retransmission sequence in accordance with various embodiments of this invention.

FIG. 13 illustrates a flowchart for determining MCS for a transmission sequence utilizing a RETC, e.g., H-ARQ, via the OTA communication link in accordance with various embodiments of the present invention. The link predictor may sort MCS combinations for a given rank according to data rates, block 1300. The initial MCS for the given rank may be designated as $M_0$, block 1304. The throughput for a transmission sequence utilizing H-ARQ may be computed for $M_0$, and for MCSs having data rates within a given range of $M_0$'s, block 1308. Thus, the additional complexity from accounting for both transmission and retransmissions in the computation of the throughput of a transmission sequence utilizing H-ARQ, e.g., computations of block 1308, may be focused on a subset of the total number of MCS candidates. This subset may be defined in part by the initial MCS and therefore may represent the MCS combinations most likely to achieve the greatest throughput.

The MCS corresponding to the greatest throughput may be reported along with the throughput value, block 1312.

Computation of the throughput with retransmission, block 1308, which will be elaborated below, may be done based at least in part on retransmission probabilities of each of the FEC codewords. The retransmission probabilities account for the likelihood that at least some of the codewords (or portions of the codewords) will need to be retransmitted, some multiple times.

The transmitter state given the transmissions and retransmissions of an OTA communication link with H-ARQ may form a Markov process. That is, the future state of the transmitter may be conditionally independent of past states given the present state.

For MCW, the transmitter state may include two variables: the number of transmissions for the same codeword and the status of codeword's reception that indicates "success" and "failure." For SCW, the state may only be the number of transmissions for the same codeword. The transition probability between two states may be looked up from the tables of PER vs. mutual information using the predictions of the time varying channels, the SINRs, the candidate MCS combination, H-ARQ combining technique, and fading margin. The channel prediction error may be greater for a later retransmission and a greater margin may be needed for a later transmission.

The AMI may increase with the number of transmissions due to H-ARQ combining, where the receiver 108 combines the multiple received versions of the same information bits for decoding. When the receiver 108 uses Chase combining and the transmitter 104 uses non-blanking for H-ARQ, the mutual information may be approximated by that of the initial transmission multiplied by the number of transmissions. When returning from the other states to the state 1, the receiver 108 may correctly receive different amounts of data with different probabilities.

Once all transition probabilities are determined, the probability of the process staying in each state may be computed. The averaged throughput of the process may be computed using the transitions returning state 1, the state probabilities, and the probabilities receiving different amounts of data.

To accommodate H-ARQ, the mutual information from multiple transmissions may be added together for the PER lookup of the retransmissions. For example, one FEC codeword may include 200 codebits that are generated from 100 information bits. The code rate is ½. The 200 codebits are carried by 16 QAM symbols in the first transmission. The mutual information of each 16 QAM symbol and the mutual information per codebit can be computed. In the expected retransmission, for system using Chase combining, transmitter may send the 200 codebits again using 64 QAM. The mutual information of each 64 QAM symbol and the mutual information per codebit can be computed. The average mutual information used in PER lookup for the second transmission is the sum of the two mutual information per codebit, where the PER vs. AMI curve is for code rate ½. The modulation level of the PER vs. AMI curve may be 64 QAM or 16 QAM, or a new PER curve may be generated for lookup by linearly combining the PER curves for 64 QAM and 16 QAM.

The AMI for SCW may be computed similar to above, where the codeword may be carried by multiple modulation levels. For example, the FEC codeword may include 200 codebits that are generated from 100 information bits. The code rate is ½. The 200 codebits are carried by 16 QAM and 64 QAM symbols in one transmission. The mutual information of each 16 QAM symbol can be computed and the mutual information of each 64 QAM symbol can be computed. The average mutual information per codebit may be computed for the codeword as the sum of the mutual information of all QAM symbols divided by the number of codebits. The modulation level of the PER vs. AMI curve may be 64 QAM or 16 QAM, or a new PER curve may be generated for lookup by linearly combining the PER curves for 64 QAM and 16 QAM.

For a system using incremental redundancy (IR) combining, the transmitter may send 50 additional codebits using QPSK. The mutual information of each QPSK symbol and the mutual information per codebit can be computed for the additional 50 codebits. The mutual information per codebit from the two transmissions are weighted and added together as $$m_1 + \frac{50}{200} m_2, \qquad [\text{EQ. 14}]$$

where $m_1$ and $m_2$ are the mutual information per codebit of the first and second transmissions, respectively. In general, the summation is $$m_1 + \sum_{i=2}^{J} \frac{N_i}{N_1} m_i, \qquad [\text{EQ. 15}]$$

where J is the number of transmissions for the PER lookup, $N_i$ is the number of codebits in the $i^{th}$ transmission, $m_i$ is the average mutual information per codebit of the $i^{th}$ transmission. This equation works for both Chase combining and IR combining. By this way, we can use the PER vs. mutual information curve for the modulation and code rate of the first transmission to look up PER for the subsequent transmission, where only the average mutual information per codebit is increased as transmissions.

The greedy search described and illustrated in FIG. 13 may be employed by adaptations after the initial adaptation operation, which may use the MCSs for each rank obtained from the previous operation as the initial search point. This may reduce the computation complexity for the subsequent adaptations.

Figure 14:
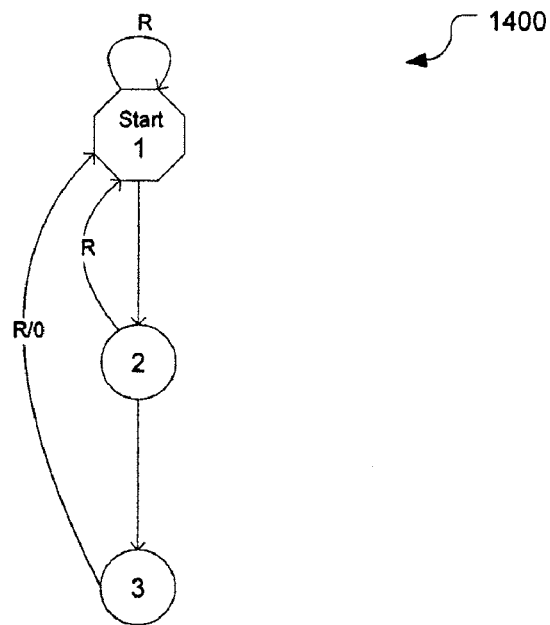
FIGS. 14-17 illustrate various state diagrams in accordance with various embodiment of the present invention.

FIG. 14 illustrates a state diagram 1400 for SCW in accordance with various embodiments of the present invention. The state diagram 1400 provides for a maximum retransmission number of two; however, it may be extended to other numbers of retransmissions. The value given on the arc may be the valued of bits correctly received. R/0 means that either R or 0 bits is received with probabilities.

In the state diagram 1400 there may be three floors from the top to the bottom, which correspond to the three transmissions. The packet may not be sent yet in state 1. After the first, initial transmission, the packet may be successfully received and R bits may be received. The transmitter 104 gets back to state 1 for the next packet. Otherwise, the transmitter 104 enters state 2, where the first retransmission or the second transmission is not conducted yet. The probability of the success for the first transmission may be 1-PER, where PER may be obtained in a manner similar to that describe in block 1020 of FIG. 10.

After the first retransmission, the packet may be correctly received with R bits and the transmitter 104 may go back to state 1 for the next packet. Otherwise, the transmitter 104 may enter state 3 for the second retransmission. With the maximum number of retransmissions being two, after the second transmission, the transmitter 104 may enter state 1 for the next packet regardless of the reception status of the second transmission. Therefore, the transition probability from state 3 to 1 may be one. The receiver 108 may receive the packet with R bits or 0 bits, i.e., fail to receive it. The probability of reception success may be 1-PER, where the PER may decrease with the number of retransmissions due to H-ARQ combining. In addition, the channel variation between the initial transmission and retransmissions may also lead to PER variation. The transition probability from state i to state j may be noted as $p_{i,j}$, and the probability of correctly receiving R bits when the transition from state i to state 1 occurs may be noted as $r_i(R)$. The probability with which the process stays in each state, e.g., stationary distribution, may be computed as $$\pi = [1 \ldots 1]\left(\begin{bmatrix} 1 & & \\ & \ddots & \\ & & 1 \end{bmatrix} - [p_{i,j}] + [1_{i,j}]\right)^{-1}, \quad [\text{EQ. 16}]$$

where $\pi_i$ is the probability that the process stays in state i, the dimension of the matrix and vector may equal the number of states, Ns; $[a_{i,j}]$ denotes a matrix whose entry on the $i^{th}$ row and $j^{th}$ column is $a_{i,j}$. The average throughput of the link may be computed as $$t_p = R\sum_{i=1}^{N_s} \pi_i r_i(R) p_{i,1}. \quad [\text{EQ. 17}]$$

Figure 15:
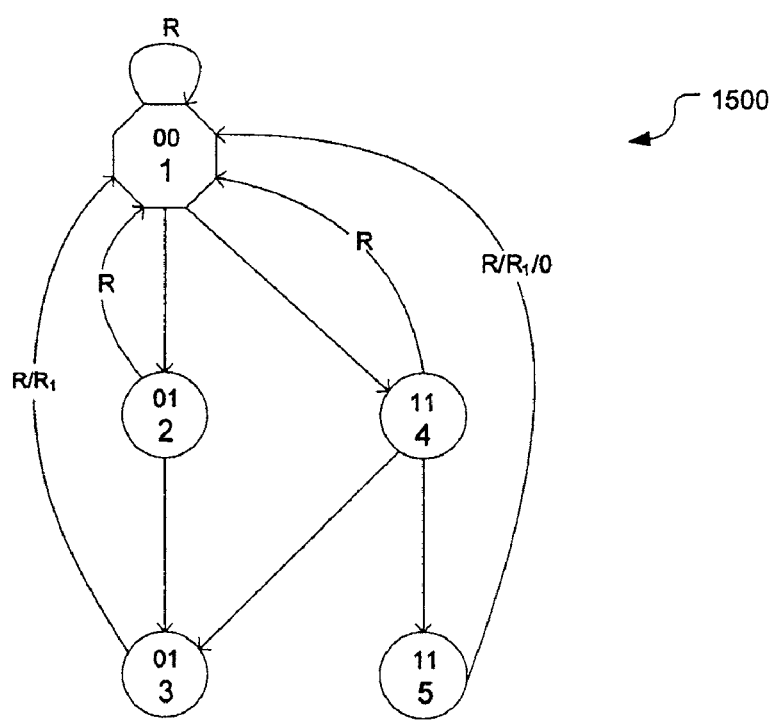

FIG. 15 illustrates a state diagram 1500 for MCW with two codewords in accordance with various embodiments of the present invention. In this embodiment, the receiver 108 may be a SIC receiver, the maximum number of retransmissions may be two, and the total number of bits in the two codewords may be R. The bit numbers of the first and second codewords are $R_1$ and $R_2$, where $R_1+R_2=R$. Non-blanking may be used at the transmitter 108 to replace a successfully received codeword by a new codeword in each transmission. The state diagram 1500 may be extended to other numbers of retransmissions and non-blanking case by adding states.

In this embodiment, there may be three floors from the top to the bottom, which correspond to the three transmissions. The packet may not be sent yet in state 1. After the first, initial transmission, if both codewords are successfully received, R bits may be received and the transmitter 104 gets back to state 1 for the next transmission with two new FEC codewords. If the first codeword is correctly received but not the second, the transmitter 104 may enter state 2, where the first retransmission or the second transmission is not conducted yet. If the first codeword is not correctly received, the SIC may not be conducted and the second codeword may not be received either, and the transmitter enters state 4. The probability of error for each codeword may be obtained in a manner similar to that described in block 1020 of FIG. 10 or block 1228 of FIG. 12.

From state 2, after the first retransmission of the second codeword, if the second codeword is correctly received, R bits may be received and the transmitter 104 may go back to state 1 to send two new codewords. If the second codeword still cannot be received, the transmitter 104 may enter state 3, where there is only one transmission chance left for the second codeword.

From state 3, after the second retransmission of the second codeword, if the second codeword is correctly received, R bits may be received and the transmitter 104 may go back to state 1 to send two new codewords. Even if the second codeword still cannot be received, the transmitter 104 may return to state 1 with $R_1$ bits correctly received from the first codeword.

From state 4, after the first retransmission of the two codewords, if both the codewords are correctly received, R bits may be received and the transmitter 104 may go back to state 1. If both the codewords still cannot be received, the transmitter 104 may enter state 5, where there is only one transmission chance left. If the first codeword is correctly received but not the second, the transmitter may enter state 3. From state 5, after the second retransmission of both the codewords, the transmitter 104 may return to state 1 because the transmission chances are exhausted. If both the codewords are correctly received, R bits may be received; if only the first codeword is correctly received during all three transmissions, $R_1$ bits may be received from the first codeword; if none of the codewords are correctly received, zero bits may be received. The probability of codeword success may be 1-PER, where the PER decreases with the number of retransmissions due to H-ARQ combining. In addition, the channel variation between the initial transmission and retransmissions may also lead to the PER variation. The transition probability from state i to state j may be noted as $p_{i,j}$, and the probability of correctly receiving Q bits when the transition from state i to state 1 occurs may be noted as $r_i(Q)$. The probability with which the process stays in each state may be computed as $$\pi = [1 \ldots 1]\left(\begin{bmatrix} 1 & & \\ & \ddots & \\ & & 1 \end{bmatrix} - [p_{i,j}] + [1_{i,j}]\right)^{-1}, \quad [\text{EQ. 18}]$$

where $\pi_i$ is the probability that the process stays in state i, the dimension of the matrix and vector may equal the number of states, Ns; $[a_{i,j}]$ denotes a matrix whose entry on the $i^{th}$ row and $j^{th}$ column is $a_{i,j}$. The average throughput of the link may be computed as $$t_p = \sum_{i=1}^{N_s} \pi_i p_{i,1} \sum_{l=1}^{N_L} \left(\sum_{m=1}^{l} R_m\right) r_l \left(\left(\sum_{m=1}^{l} R_m\right)\right), \quad \text{[EQ. 19]}$$

where $N_L$ may be the number of layers or codewords. The term $$\sum_{l=1}^{N_L} \left(\sum_{m=1}^{l} R_m\right) r_l \left(\left(\sum_{m=1}^{l} R_m\right)\right)$$

may be the average throughput over the transition from state i to 1.

Figure 16:
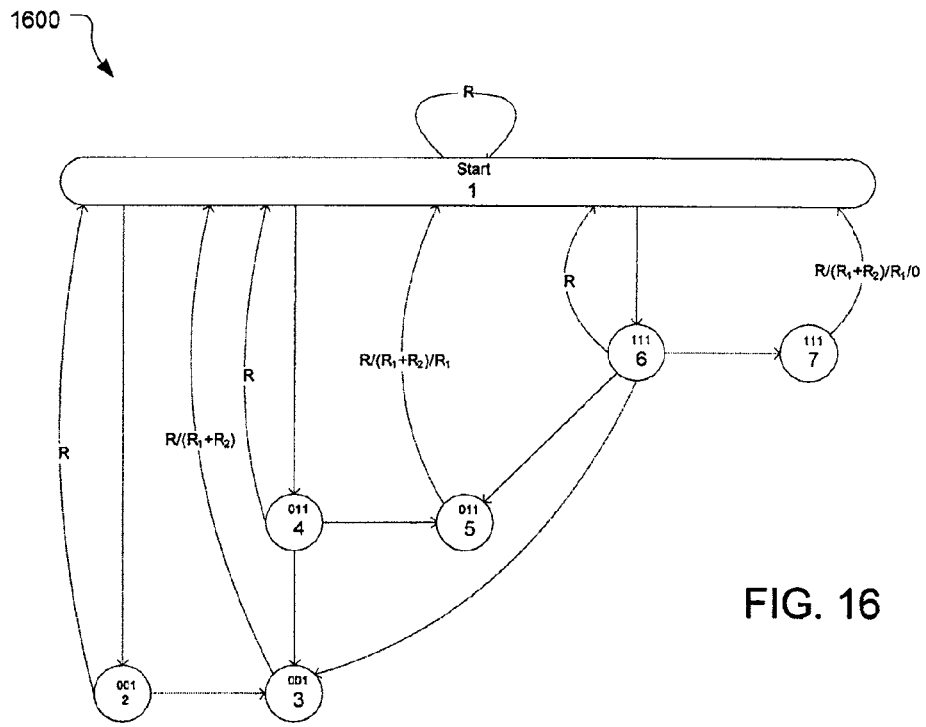
Figure 17:
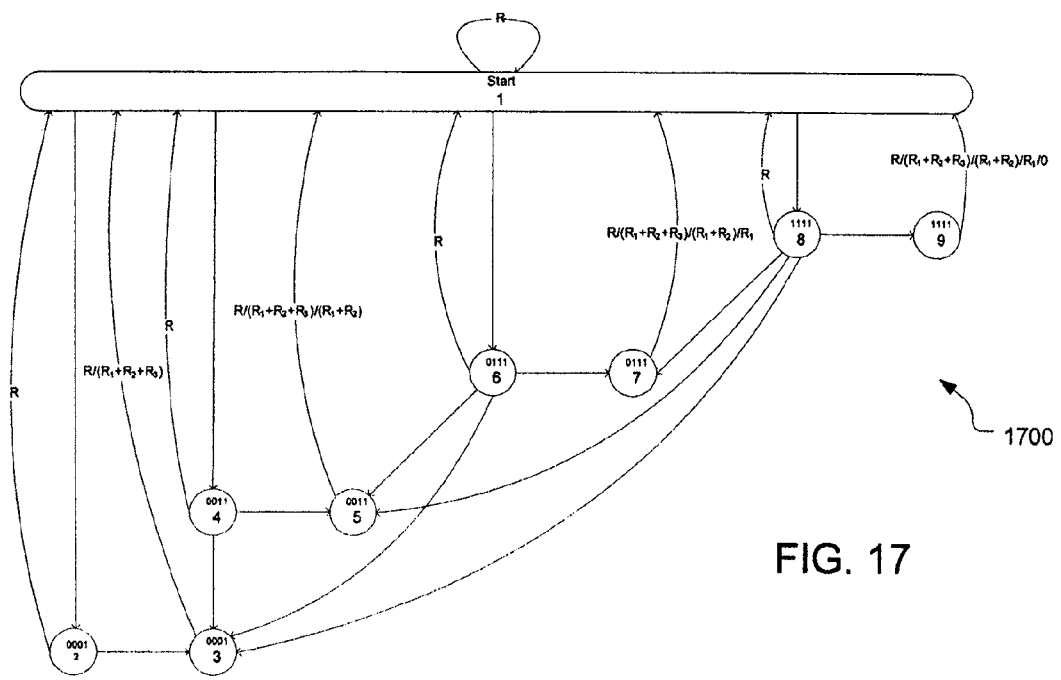

In similar manners, equations 17 and 18 may be used with MCW embodiments having other number of codewords, e.g., three or four. FIGS. 16 and 17, respectively, illustrate state diagrams 1600 and 1700 for MCW having three and four codewords in accordance with various embodiments of the present invention. In these embodiments the maximum number of transmissions may be three and blanking may be employed at the transmitter 104. The extension to non-blanking and other number of transmissions may be done by adding more states, where the number of transmissions for each codeword instead of the packet (that has multiple codewords as in blanking cases) may be tracked.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
   obtaining channel state data on one or more conditions of an over-the-air (OTA) communication link;
   determining a retransmission error control technique (RECT); and
   selecting a modulation and coding scheme (MCS) and a rank configured to provide a desired transmission characteristic for a transmission sequence utilizing the RECT, the selecting being based at least in part on the determined RECT and the obtained channel state data.

2. The method of claim 1, wherein said selecting of the MCS and the rank comprises:
   determining a non-retransmission MCS for each of a number of ranks, said non-retransmission MCS configured to provide the desired transmission characteristic for the respective rank for a computed transmission sequence that does not account for the RECT; and
   selecting said MCS and rank for the transmission sequence based at least in part on said determined non-retransmission MCSs.

3. The method of claim 2, further comprising:
   determining a candidate MCS for each of the number of ranks based at least in part on said determined non-retransmission MCS for the respective rank, the candidate MCS configured to provide the desired transmission characteristic for another computed transmission sequence that accounts for the RECT; and
   selecting said MCS for the transmission sequence from said determined candidate MCSs.

4. The method of claim 3, further comprising:
   computing a signal to interference and noise ratio (SINR) value for each of a plurality of symbols of one or more forward error correction codewords based on the obtained channel state data.

5. The method of claim 4, wherein said desired transmission characteristic is a desired throughput value characteristic and said determining of the non-retransmission MCSs comprises:
   computing throughput values of the plurality of symbols for each of a number of MCSs for each of the number of ranks; and
   identifying, for each of the number of ranks, an MCS associated with a computed throughput value larger than all of the other computed throughput values for the particular rank.

6. The method of claim 5, wherein said computing of the throughput values further comprises:
   computing mutual information of each of the plurality of symbols; and
   computing an average mutual information based on the computed mutual information of each of the plurality of symbols.

7. The method of claim 6, wherein said computing of the throughput values further comprises:
   determining a packet error rate (PER) based at least in part on the average mutual information; and
   computing throughput values based at least in part on the determined PER.

8. The method of claim 7, wherein said determining of the PER based at least in part on the average mutual information comprises:
   referencing one or more lookup tables relating averaged mutual information to PER for the number of MCSs.

9. The method of claim 1, wherein the RECT is a hybrid—automatic repeat request (H-ARQ) technique.

10. The method of claim 1, wherein said selecting of the MCS and rank based at least in part on the RECT and the obtained channel state data further comprises:
    computing throughput values for a number of forward error correction (FEC) codewords for each of a number of MCSs for a computed transmission sequence utilizing the RECT.

11. The method of claim 10, wherein said computing of the throughput values is based at least in part on retransmission probabilities for each of the number of FEC codewords.

12. The method of claim 1, further comprising:
    determining a receiver scheme; and
    the selecting of the MCS and rank is further based on the determined receiver scheme.

13. The method of claim 12, wherein the receiver scheme is a successive interference cancellation scheme, the method further comprising:
    computing throughput values for a plurality of forward error correction (FEC) codewords in an ordered sequence based at least in part on likelihood of successful decoding of any previous FEC codewords in said ordered sequence; the ordered sequence being inverse to a decoding ordered sequence.

14. An apparatus comprising:
one or more antennas to provide the apparatus with a wireless interface to an over-the-air (OTA) communication link; and
a link predictor coupled to the one or more antennas and configured to
obtain channel state data on one or more conditions of the OTA communication link;
determine a retransmission error control technique (RECT); and
select a modulation and coding scheme (MCS) and a rank configured to provide a desired transmission characteristic for a transmission sequence utilizing the RECT, the select being based at least in part on the RECT and the obtained channel state data.

15. The apparatus of claim 14, further comprising:
a channel estimator coupled to the one or more antennas and configured to observe the OTA communication link and determine the channel state data including interference and/or noise levels.

16. The apparatus of claim 14, further comprising:
an automatic bit loader (ABL) controller coupled to the link predictor and configured to modulate one or more data streams according to the selected MCS; and
a beamformer coupled to the link predictor and configured to transmit the one or more data streams with the selected rank.

17. The apparatus of claim 14, wherein the link predictor is further configured to
determine a non-retransmission MCS for each of a number of ranks, said non-retransmission MCS configured to provide the desired transmission characteristic for the respective rank for a computed transmission sequence that does not account for the RECT; and
select said MCS and rank for the transmission sequence based at least in part on said determined non-retransmission MCSs.

18. A system comprising:
a plurality of receive antennas configured to provide the system with a wireless interface to an over-the-air (OTA) communication link; and
a link adaptor coupled to the plurality of receive antennas, the link adaptor including a channel estimator configured to observe the OTA communication link and determine channel state data on one or more conditions of the OTA communication link, and a link predictor configured to obtain the channel state data from the channel estimator, determine a retransmission error control technique (RECT), and select a modulation and coding scheme (MCS) and a rank configured to provide a desired transmission characteristic for a transmission sequence utilizing the RECT based at least in part on the RECT and the obtained channel state data.

19. The system of claim 18, wherein the link predictor is configured to upload the selected MCS and rank to a transmitter via the OTA communication link.

20. The system of claim 18, wherein the link predictor is further configured to
determine a non-retransmission MCS for each of a number of ranks, said non-retransmission MCS configured to provide the desired transmission characteristic for the respective rank for a computed transmission sequence that does not account for the RECT; and
select said MCS and rank for the transmission sequence based at least in part on said determined non-retransmission MCSs.

21. An article of manufacture comprising a computer readable storage medium including computer executable instructions, which, when executed, results in a machine:
obtaining channel state data on one or more conditions of an over-the-air (OTA) communication link;
determining a retransmission error control technique (RECT); and
selecting a modulation and coding scheme (MCS) and a rank configured to provide a desired transmission characteristic for a transmission sequence utilizing the RECT, the selecting being based at least in part on the determined RECT and the obtained channel state data.

22. The article of manufacture of claim 21, wherein said selecting of the MCS and the rank comprises:
determining a non-retransmission MCS for each of a number of ranks, said non-retransmission MCS configured to provide the desired transmission characteristic for the respective rank for a computed transmission sequence that does not account for the RECT; and
selecting said MCS and rank for the transmission sequence based at least in part on said determined non-retransmission MCSs.

23. The article of manufacture of claim 22, wherein said desired transmission characteristic is a desired throughput value characteristic and said determining of the non-retransmission MCSs comprises:
computing throughput values of the plurality of symbols for each of a number of MCSs for each of the number of ranks; and
identifying, for each of the number of ranks, an MCS associated with a computed throughput value larger than all of the other computed throughput values for the particular rank.

24. The article of manufacture of claim 21, wherein said selecting of the MCS and rank further comprises:
computing mutual information of each of the plurality of symbols; and
computing an average mutual information based on the computed mutual information of each of the plurality of symbols.

25. The article of manufacture of claim 24, wherein said selecting of the MCS and rank further comprises:
determining a packet error rate (PER) based at least in part on the average mutual information; and
computing throughput values based at least in part on the determined PER.

26. The article of manufacture of claim 21, wherein the RECT is a hybrid—automatic repeat request (H-ARQ) technique.

27. The article of manufacture of claim 21, wherein said selecting of the MCS and rank based at least in part on the RECT and the obtained channel state data further comprises:
computing throughput values for a number of forward error correction (FEC) codewords for each of a number of MCSs for a computed transmission sequence utilizing the RECT.

* * * * *

UNITED STATES PATENT AND TRADEMARK OFFICE
CERTIFICATE OF CORRECTION

PATENT NO.        : 7,661,038 B2                           Page 1 of 1
APPLICATION NO. : 11/539867
DATED             : February 9, 2010
INVENTOR(S)       : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this

Fourth Day of January, 2011

David J. Kappos
*Director of the United States Patent and Trademark Office*